United States Patent
Anderson

[11] 3,935,430
[45] Jan. 27, 1976

[54] NOTCH AND FILE SYSTEM
[75] Inventor: Thomas P. Anderson, Hubbard Woods, Ill.
[73] Assignee: Microseal Corporation, Evanston, Ill.
[22] Filed: May 3, 1971
[21] Appl. No.: 139,591

[52] U.S. Cl. .................. 235/61.12 R; 235/61.12
[51] Int. Cl.² ........................................ G06K 21/00
[58] Field of Search ............. 235/61.12 R; 209/80.5

[56] References Cited
UNITED STATES PATENTS
2,213,607  9/1940  Nevin ............................ 235/61.12
2,834,353  5/1958  Rembold ........................ 235/61.12

FOREIGN PATENTS OR APPLICATIONS
551,078  9/1956  Belgium ..................... 235/61.12 R Primary Examiner—Joseph M. Thesz, Jr.
Attorney, Agent, or Firm—Hill, Gross, Simpson, Van Santen, Steadman, Chiara & Simpson

[57] ABSTRACT

The method or system of indexing cards for visual or machine filing and retrieval includes an index card having a plurality of notch areas located along at least a portion of the card edge with each of the notch areas being assigned at least two values and being adapted to receive a plurality of superimposable, separately identifiable notches to separately designate each notch area value.

1 Claim, 4 Drawing Figures

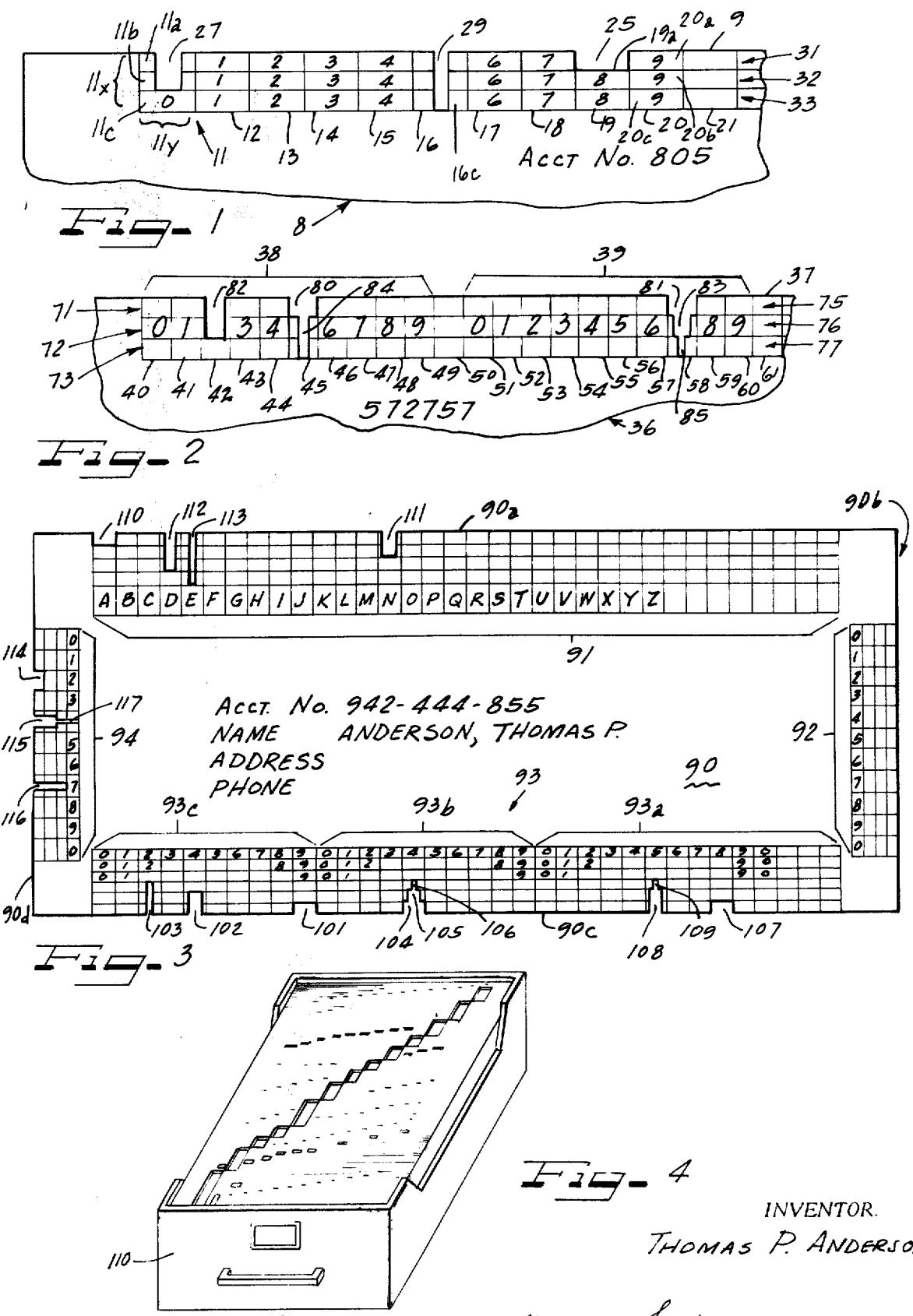

NOTCH AND FILE SYSTEM

BACKGROUND OF THE INVENTION

1. Field of the Invention

This invention generally relates to card exhibiting and more particularly concerns a method or system of indexing cards and the index card and notch configurations used therein.

2. Prior Art

The number and complexity of records which must be kept in business has created a very real need for a compact, yet simple record keeping system. Complex computer systems have limitations on their use and rather then providing the solution in many areas, have merely served to accentuate the problems. There have been many attempts to meet these expanding needs, however, none possess the compactness, simplicity and the many advantages of this invention wherein a plurality of variously configured superimposable notches in a multi-valued reference area serve to clearly and accurately designate individual values. Thus, the idea of indexing cards by notching a card at a particular multi-valued reference designation located along a card edge is shown to be old, for example, by the U.S. Pat. No. 821,602 and the French Patent 1,046,381. While these examples have many fine features, yet they lack the compactness, simplicity, and adaptability which is characteristic of the present invention. In each case in the prior art the multi-valued reference area can only be notched or marked to designate one value.

SUMMARY OF THE INVENTION

The disadvantages and shortcomings of the prior art are overcome by my notch and file system and card wherein a plurality of superimposable, separately identifiable notches are cut in multi-valued card reference areas to allow designation of each value. Contrary to the prior art teachings, I have found that the same notch area on an index card can be used to designate more than one value if different types of notches are used that do not block each other out, but are readily distinguishable from each other when they are superimposed.

As a result of my invention the use of index cards having multi-valued reference areas may be increased by the number of values assigned to each reference area. By this means the capacity of card index systems is, at the very least doubled and readily tripled, quadrupled, etc., as far as the cards, notches and other designations will permit. The corresponding reduction in the volume of records permits significant savings in equipment, floor space and manpower.

According to my invention the reference or notch areas are positioned along an edge on one side of a card and extend for at least a portion of the length of the edge. Although I have found a rectangular card to be compatible with present business systems records, my invention is not so limited as it is equally applicable to cards of almost any shape. With a rectangular card it is contemplated that reference or notch areas having a plurality of value designations or indicia will be provided along any of the four edges and on either side as desired. Each notch area may be said to have a depth extending inwardly from the card edge with each reference area being sub-divided along its depth into a plurality of zones which may each represent or designate a different value or reference. These values or references may take any form, such as numerals, letters of all kinds, symbols etc., in any combination or arrangement. It is an important object of this invention that for each designation assigned to each notch or reference area, there be a separate, readily distinguishable notch therefor. For example, where the notch area is sub-divided into first, second and third zones, each representing a different value, the zones will form first, second and third sets of digits, letters or symbols. For each set a separate superimposable, readily distinguishable notch will identify the digit, letter or symbol selected. A standard order of notch and set designation facilitates interpretation. Thus, the first notch means may identify the value from the respective first, second and third sets and be placed in order, one, two, three.

Where the notches are distinguished from each other manually as by viewing, for example, it is important that the characteristics distinguishing the notches from each other usually will be those visible from above so that cards in a drawer may be readily identified. However, where the cards are to be distinguished mechanically, as for example, by machine, this limitation on the distinguishing characteristics may not be as important. In fact, for a machine readable card various hole configurations may be similarly effective in identifying different values in each set. In the example of a system having first, second and third notches, they may be distinguished on the basis that the first notch will be wider than the second or third notches; the second notch will be wider than the third; the third notch will be deeper than either of the first or second notches and the second notch will be deeper than the first. My invention contemplates a particular notched index card, a notch file system of index cards and the methods of notching the cards and implementing the system.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

FIG. 1 illustrates a portion of a card edge having reference areas and notches thereon to indicate, by way of example, the value 805;

FIG. 2 is an illustration according to the invention wherein the reference areas and notches in a card edge portion serve to indicate the set of values 572757;

FIG. 3 illustrates an embodiment of the invention as applied to a rectangular shaped index card; and FIG. 4 illustrates an application of the system herein as applied to a drawer of index cards.

DESCRIPTION OF THE PREFERRED EMBODIMENT

According to the embodiment of the invention as set forth in FIG. 1, a portion of an index card generally indicated at 8 includes an edge 9 along which there are suitably marked a plurality of reference or notch areas 11 through 21. While the particular size, configuration and indicia of these areas 11 through 21 may be various and variable to suit different needs, I have achieved satisfactory results from a rectangular configuration having a depth such as illustrated by way of example, at 11y and a width such as illustrated at 11x. When the areas 11–21 are adjacent to each other as shown, they may conveniently each have the same depth and width. The depth and width dimensions have not been separately designated in FIG. 1 but will be understood by those skilled in the art.

Each of the areas 11 through 21 will be appropriately marked and identified with a plurality of values and/or references. As illustrated in FIG. 1 each of the areas 11 through 21 is sub-divided along its length into a plurality of zones which each represent or designate a different value or reference. These values or references may take any form, such as numerals, letters of all kinds, symbols, etc., in any arrangement or combination. As shown, each of the areas is divided into a first zone having the suffix (a), a second zone having the suffix (b), and a third zone having the suffix (c). Further sub-division may be made as required. The value marking for each of the zones may be effected in any convenient manner. Thus, as shown in FIG. 1 each of the zones may be separately marked. In FIG. 2 a single indicia extends through all zones and in FIG. 3 the zones themselves have no marking but their value is taken from reference indicia in correspondingly arranged zones below the zones. It is of course possible that no indicia may appear on the card but rather could be placed solely on the file drawer, and appropriately spaced divider or other reference means.

Identification of the individual zones for a selected set of designated reference areas is made possible according to my invention by the provision of a separate, readily distinguishable notch for each zone of the reference areas 11 through 21. Thus, where each of the areas 11 through 21 are sub-divided into first, second and third zones indicated by the suffix a, b, c to the area reference numeral, the zone identification means will comprise a first notch 25, a second notch 27 and a third notch 29. Each is of a different configuration so as to be readily distinguishable from the other. In this arrangement I have found it advantageous to have the first notch means 25 of a wide and shallow configuration generally conforming to the size and shape of the first zone which in this case is 19a.

The second notch means 27 advantageously extends into the second zone 11b and is distinguishable from the first notch means 25 by the fact that it is narrower and deeper. Similarly the third notch means 29 may be seen extending into the third zone 16c. The third notch means 29 is distinguishable from the first notch means 25 and the second notch means 27 by the fact that it is both narrower and deeper than either of these notch means. These distinctions between the notch means 25, 27 and 29 will hold true when they are superimposed upon each other in one reference area as will be shown in a later example.

In this example each of the areas 11 through 21 and each of the first, second and third zones in each area, have been assigned a particular reference value ranging from zero (0) to nine (9) respectively. The zones of each area have the same value and each zone is separately marked with a symbol of its value. The total number of the first zone of each of the reference areas 11 through 21 may be said to constitute a first set of symbols or values. Here the first set may be seen to comprise 11a through 20a and for purposes of explanation is generally indicated by the reference number 31. Similarly, the second zones 11b through 20b form a second set generally indicated at 32 and the third zones 11c through 20c form a third set generally indicated at 33. The composition of each set, the type and range of symbols or values assigned to it and the number of sets cooperating to produce a result may be varied to suit the circumstances in each case. The examples herein will be understood to be for purposes of illustration only.

A superimposable, readily distinguishable notch means separately identifies each set. Thus, in FIG. 1, the first notch 25 identifies the symbol or value selected from the first set 31, the second notch means 27 identifies the symbol or value selected from the second set 32, and the third notch means 29 identifies the symbol or value selected from the third set 33. With the notch arrangement according to the present invention any combination of values may be represented. Thus, where it is desired to designate the number 805 the first number may be selected from the first set 31 by providing the notch 25 in the area 19a. The identification of the second value, zero (0) will be made from 11b of the second set 32 by the second notch 27. In similar fashion the value "5" will be identified in the third set 33 by the notch means 29. This system of superimposable notches which may be readily distinguished from each other even when they occupy the same notch area provides a very compact indexing system wherein any number of digits may be indicated in any order. The words "superimposed" and "superimposable" must be interpreted in a description of this invention as meaning that they may be placed "on top of" or after one another with each occupying a common space but yet not being completely coextensive with one another so that one notch could block out or obscure another notch. It is thus the uncommon areas between the notches which distinguishes them one from the other.

Referring to FIG. 2 it may be seen that the principles of this invention may be carried forward to two groups of reference areas along the same edge of a card to increase the number of values which may be identified. Thus, a portion of a card generally indicated at 36 has an edge 37 along which are positioned a first group of notch or reference areas 38 and a second group of notch or reference areas 39. In this case the edge area of the card is divided into notch or reference areas 40 through 61. The first group 38 of reference areas includes reference areas 40 through 49 while the second group 39 includes reference areas 51 through 60. The first group 38 has a first set of reference values or symbols 71, a second set 72 and a third set 73. Similarly, the second group 39 has a first set 75, a second set 76 and a third set 77. As before, each set includes the respective zone portion of each of the reference areas in the group. Each set of values or symbols will have a separate, superimposable notch identifying the value or symbol selected therefrom. With each of the two groups 38 and 39 having three sets of digits it follows that six separate digits may be readily identified. The order in which the digits are identified may be in any convenient manner. Thus, with the single group of reference areas in FIG. 1 divided into three sets, the numerals 805 were taken from the first, second and third sets respectively. In the example shown in FIG. 2 the numerals 572757 were identified or designated by a first notch 80 in set 71, a first notch 81 in set 75, a second notch 82 in set 72, a second notch 83 in set 76, a third notch 84 in set 73, and a third notch 85 in set 77, respectively. It is equally as possible to identify or designate the numbers in order from the sets 71, 72, 73, 75, 76, 77 respectively.

A very significant feature of the present invention is illustrated by the fact that notches 81, 83 and 85 may all be superimposed upon each other in the same reference area 58 and still be clearly and readily distinguishable from each other. Moreover, they are distinguishable from one another regardless of the particular combination of notches or order in which the notches are put in the edge. While only two groups of reference areas 38, 39 have been described, it will be understood that the invention is not so limited, but in fact contemplates any number of such groups of areas, any number of reference areas in each group, any number of sets in each group, any number of zones in each area, and any type of designation for each area.

FIG. 3 illustrates another application of the invention to one side of a rectangularly shaped business card 90. In this case a first group 91 of letters extends along a portion of a first edge 90a, a second group 92 of digits extends along a second side 90b, a plurality of groups 93a, 93b, 93c, of digits extends along a third side 90c, and a fourth group 94 of digits extends along a fourth side 90d. Each of these groups may have any number of sets so that if each of the six groups 91, 92, 93a, 93b, 93c, and 94 have just three sets apiece the total number of letters, digits, symbols, etc., which may be identified on that card would be 18. If the group 91 comprised three separate digit sets such as 93a, 93b, 93c it may be seen that the number of groups on the card could be expanded to 9. By varying the number of groups on each card and the number of sets in each group it will be understood that great flexibility is possible in the amount of information which may be stored on each card. In addition each card may incorporate other identifying means such as multiple card, edge and symbol colors, interior holes of the same or various configurations and other printed matter.

A great flexibility of use is provided by the notches on the card. For example, the notch information in one area may be related to the notch information in another area, thus, in the card of FIG. 3 one or more of the various groups 91, 92, 93 and 94 may be inter-related with each other. Specifically the flexibility is such that the notches 101 through 117 may be "read" in any order.

Index cards such as illustrated at 90 in FIG. 3 may be conveniently stored in a drawer such as shown at 110 in FIG. 4 whereby the upper edge 90a and the appropriate notches therein will be visible along with the notches in the side edges 90b and 90d. In this case the notches in the edge 90c may be optically identified as with tilting the drawer upwardly or by means of ribs in the bottom of the drawer extending between sub-divided segments of the drawer. The notch configurations for each of the card sides need not be the same so that where the edge 90c cooperates with ribs on a drawer bottom perhaps a fewer number of identifying notches with a larger configuration may be provided. With a 4 by 6 card I have found that a reference area of 4.75 millimeters by 4.5 millimeters provides satisfactory results. The 4.5 millimeter depth may be divided into three zones each 4.75 millimeters wide by 1.5 millimeters deep. The identifying indicia may be imprinted in each of the zones, may be set to extend through all of the zones, or may be printed below the zones in an area approximately 4 millimeters deep. These index cards may be symmetrical about a centerline so that the areas presented for punching will be the same regardless of the way in which the card lies. In the example of the 4 by 6 card above having three zones, there may be provided a first notch 1.5 millimeters deep by 4.75 millimeters wide, a second notch 3 millimeters deep by 3 millimeters wide, and a third notch one millimeter wide by 4.5 millimeters deep. In this case the first notch will completely remove the first zone whereas the second and third notches will remove only a portion of the zone which they identify. The second and third notches may be positioned anywhere in-between the 4.75 millimeter width of the reference area. I have found that a centering of the second and third notches produces satisfactory results.

While the bottom edge of a card, as for example 90c in FIG. 3, may contain three or more independent sets of numbers giving a total of nine or more values, I have found that the bottom notches may advantageously serve as "large number" separations e.q. by three number series, in a file drawer equipped with preset raised bottom guides. Thus, in the example preset raised guides in a drawer 110 having a configuration generally mating with that of the notches 101, 102, 103 would allow the card 90 to be filed in a drawer only with cards of the 942 series. Cards of other series would ride on the guides so that their misfiling would be prevented or readily detected. The particular notches to be used as filing guide could be varied to suit the filing needs. By using guides cooperative with notches 101, 104 and 107 the cards of the 948 series could be segregated in the drawer.

From the above description of my invention it may be seen that I have provided a notch and file system and card wherein a plurality of superimposable, separately identifiable notches are cut in multi-valued index card reference areas to allow designation of each value. By being able to effectively use each reference area to provide a plurality of values the capacity of index cards is greatly increased with the result that the space required to store a given number of records may be greatly decreased. Each drawer may contain a greater number of records and therefore a clerk filing records will be required to open a fewer number of drawers, make fewer motions, travel less and hence increase her efficiency. Moreover, by virtue of the invention herein there will be a reduction or outright elimination of refile errors with the further result that the accompanying problem of lost documents is solved. A similar improved efficiency holds true where the cards are being sorted by a machine.

The notch and file system of the present invention also provides the advantages that a misplaced card may be quickly identified upon a glance at a drawer and hence the accuracy of filing is greatly increased. Because of the many advantages of the present invention great economies may be effected in record keeping.

Although minor modifications might be suggested by those versed in the art, it should be understood that I wish to embody within the scope of the patent warranted hereon all such modifications as reasonably and properly come within the scope of my contribution to the art.

I claim as my invention:

1. A notch and file card comprising superimposable notches along a portion of an edge thereof, said notches being of different configurations so that when said notches are superimposed upon each other they may be visibly distinguished from each other, said notches including first, second and third notches, each of said notches having a depth and a width, said first notch being wider than said second or third notches and said second notch being wider than said third, said third notch being deeper than said first or second notch and said second notch being deeper than said first notch.

* * * * *